(No Model.)

F. L. WOODHOUSE.
TIRE FOR BICYCLES.

No. 574,015.　　　　　　　　　　Patented Dec. 29, 1896.

WITNESSES:
John Buckler,
C. Gerst

INVENTOR
Frank L. Woodhouse,
BY Edgar Tate & Co
ATTORNEYS

UNITED STATES PATENT OFFICE.

FRANK LEVI WOODHOUSE, OF WAUPUN, WISCONSIN.

TIRE FOR BICYCLES.

SPECIFICATION forming part of Letters Patent No. 574,015, dated December 29, 1896.

Application filed December 7, 1895. Serial No. 571,334. (No model.)

*To all whom it may concern:*

Be it known that I, FRANK LEVI WOODHOUSE, a citizen of the United States, and a resident of Waupun, in the county of Fond du Lac and State of Wisconsin, have invented certain new and useful Improvements in Tires for Bicycles and other Vehicles, of which the following is a specification, reference being had to the accompanying drawings, forming a part thereof, in which similar letters of reference indicate corresponding parts.

This invention relates to flexible and tubular tires for bicycles and similar vehicles; and the object thereof is to provide a tire of this class which is retained in proper and operative form by means of a spiral spring located therein; and with this and other objects in view the invention consists in the construction, combination, and arrangement of parts hereinafter described and claimed.

The invention is fully disclosed in the following specification, of which the accompanying drawings form a part, in which—

Figure 1:
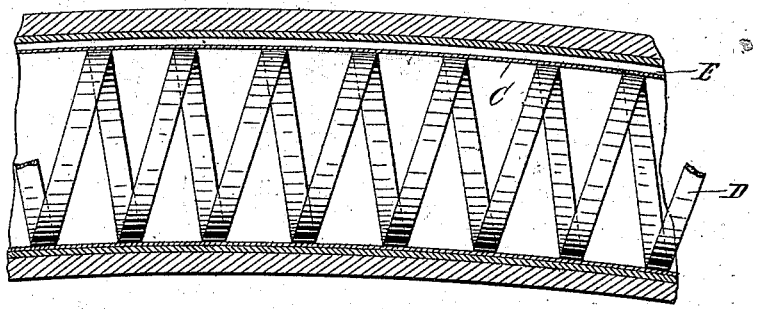
Figure 2:
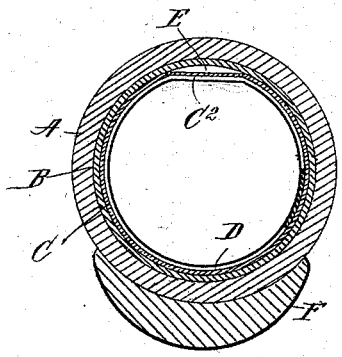

Figure 1 is a longitudinal section of a part of the tire made according to my invention, and Fig. 2 a transverse section thereof.

In the practice of my invention I provide a heavy flexible rubber tube A, within which is placed a thin, flexible, and elastic rubber tube B, and within the tube B is placed a canvas tube C, and within this inner canvas tube C is placed a spiral spring D, which is substantially tubular in form, but which is provided at its outer perimeter with a flat portion $C^2$, as clearly shown in Figs. 1 and 2, and in the normal position of the parts the canvas tube C bears upon this flat portion, and the rubber tubes A and B are extended or inflated, as shown in Fig. 2, and an annular space E is thus formed between the outer portion of the canvas tube C and the inner portion of the adjacent rubber tube B, and by means of this arrangement the tubes A and B are adapted to yield at this point to a greater extent than would otherwise be possible.

If preferred, my improved tire may be used without being inflated, the spring D serving to maintain the tire in its proper position and to give elasticity thereto; but said tire may also be inflated with air in the usual manner, if desired, and by the usual means, and in this event both the air and the spring serves to give elasticity to the tire and to maintain it in the proper form.

The tire is secured to the rim F of the wheel in the usual or in any desired manner, and it will thus be seen that I provide an effective tire of this class which is simple in construction and operation and which combines the merits of the ordinary tire with those of tubular tires with which are combined spiral springs which are usually adapted to take the place of compressed air.

The outer tube A may be made heavy, as desired or as is practicable, and it will thus be seen that I provide an effective tire which is simple in construction and operation and well adapted to accomplish the result for which it is intended.

The tube B may be made of canvas in order to give strength to the tire, or of canvas and rubber, and I may also employ a single-tube tire, or the inner tube B may be done away with entirely, and the canvas tube C, containing the spiral spring D, may be inserted immediately within the outer tube A, thus lessening the weight of the tire, while the effective working of the spring is not interfered with, but the spring D will retain the tire in its proper form, this spring, constructed as shown and described and provided with a flat outer portion, being just as applicable to a single-tube tire as to a two-tube or double tire.

Having fully described my invention, I claim as new and desire to secure by Letters Patent—

The herein-described bicycle-tire, composed of a heavy flexible rubber tube A, within which is placed an elastic rubber tube B, and a tube C of canvas within the tube B and a spiral spring D having flat portion $C^2$ located within the tube C, said tube being substantially circular in form and provided at its outer perimeter with a loose portion, whereby when the tubes A and B are inflated an annular space E is formed between the outer portion of the canvas tube C and the inner portion of the rubber tube, as and for the purpose specified.

In testimony that I claim the foregoing as my invention I have signed my name, in presence of the subscribing witnesses, this 30th day of November, 1895.

FRANK LEVI WOODHOUSE.

Witnesses:
E. D. DONEY,
BEN. KASTEIN.